United States Patent [19]

Lin

[11] Patent Number: 4,837,427
[45] Date of Patent: Jun. 6, 1989

[54] MANUALLY CODEABLE CARDS FOR CARD READERS

[75] Inventor: Jui-Chang Lin, Kaohsiung, Taiwan

[73] Assignees: Jeun-Keun Lee; In-Jyh Liou, both of Taipei, Taiwan

[21] Appl. No.: 77,300

[22] Filed: Jul. 24, 1987

[51] Int. Cl.$^4$ ............................................. G06K 21/00
[52] U.S. Cl. ..................................... 235/488; 235/489; 235/494
[58] Field of Search .............. 235/487, 488, 489, 494, 235/495; 434/364, 363

[56] References Cited

U.S. PATENT DOCUMENTS

| | | | |
|---|---|---|---|
| 2,350,382 | 6/1944 | Angel | 235/489 X |
| 3,248,808 | 5/1966 | Daker et al. | 434/363 |
| 3,359,656 | 12/1967 | Seekins | 434/363 X |
| 3,435,192 | 3/1969 | Hartney | 235/489 |
| 3,829,662 | 8/1974 | Furahashi | 235/491 X |
| 4,085,314 | 4/1978 | Schultz et al. | 235/487 |
| 4,092,526 | 5/1978 | Beck | 235/487 |

Primary Examiner—Philip H. Leung
Attorney, Agent, or Firm—Larson and Taylor

[57] ABSTRACT

A kind of manually codeable card for card readers composed of an upper and a lower sheet of transparent material glued together, the lower sheet printed with black ink all over except a plurality of transparent circles which can be sticked on to become opaque with black circles from a paper with transposable black circles or round opaque stickers. The coded number of the card is represented by the different combination of transparent and opaque circles.

4 Claims, 3 Drawing Sheets

MANUALLY CODEABLE CARDS FOR CARD READERS

BACKGROUND OF THE INVENTION

This invention concerns a kind of manually codeable cards for card readers. So far cards for card readers have usually been made by using a punching card machine which punches a lot of different combination of transparent and opaque holes in a card, in other words, a coded number in a card. So without a punching card machining a card cannot be made a card having a coded number, and it is not so convenient in using a card for a card reader.

SUMMARY OF THE INVENTION

In view of the inconvenience that a card for a card reader has to be punched by a punching card machine for being given a coded number, the inventor has thought out this new manually codeable card for a card reader.

This new card is made up of a sheet of transparent plastic, or metal and a sheet of paper, and the sheet of paper is printed with opaque ink, being left a plurality of uninked circles for a ray to pass through. Then these circles can be printed on opaque circles from a transposable paper to become opaque so as to make up a different combination of transparent circles with opaque ones, in other words, a coded number.

DETAILED DESCRIPTION OF THE INVENTION

Figure 1:
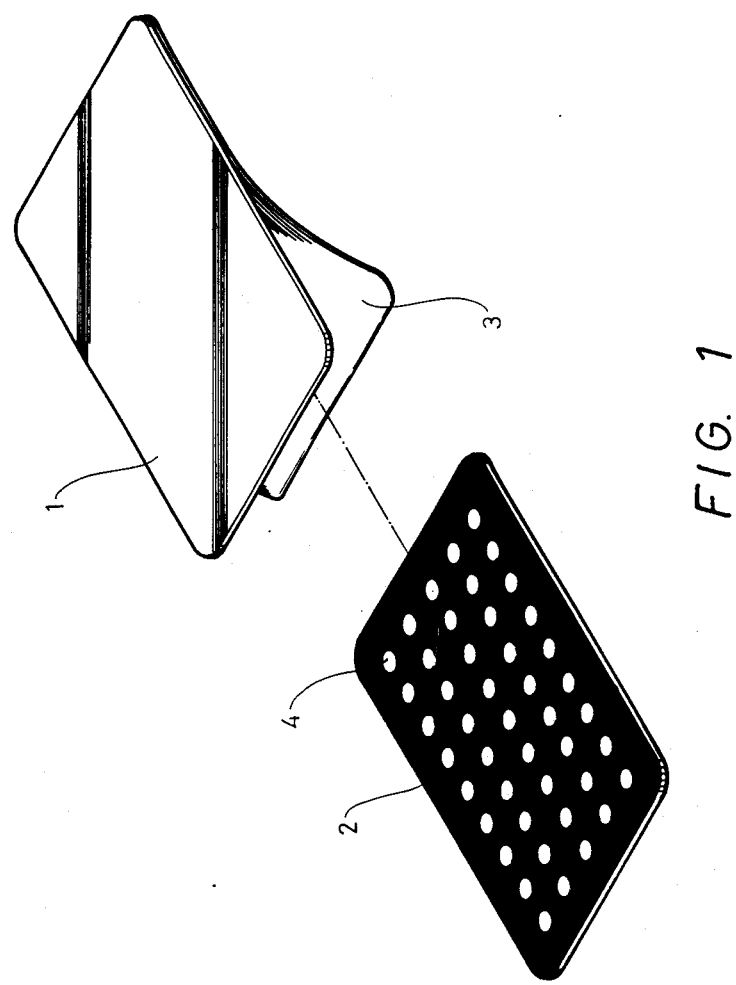
FIG. 1 is a structural view of the manually codeable card in this invention.

This manually codeable card for card readers, as FIG. 1 shows, is made up of an upper sheet 1 and a lower sheet 2; the former and the latter are all made of a transparent material like plastic, metal or paper, and one side of the upper sheet 1 is coated with a kind of glue and protected with a peeling-off oiled sheet 3. The lower sheet 2 is printed all over with opaque ink except a plurality of circles 4 which still have transparent property.

Figure 2:
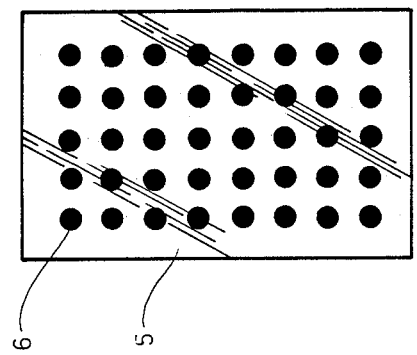
FIG. 2 is a view of the paper with transposable opaque circles in this invention.

Next, FIG. 2 shows a kind of paper 5 with the same number of transposable opaque circles on it as the circles on the lower sheet 2. This paper has the same number of black inked circles 6 as those on the lower sheet 2 that can be transposed on the lower sheet 2, but the black inked circles 6 can be substituted by a kind of round opaque stickers.

Figure 3:
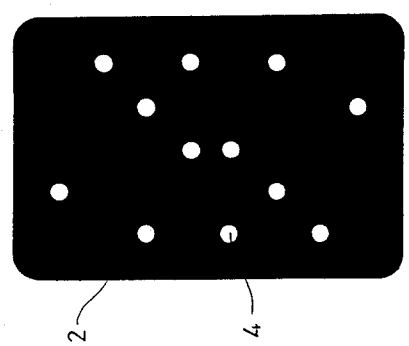
FIG. 3 is a view of this card already manually coded by transposing a number of opaque circles on transparent circles in this invention.

When this card is going to be manually coded with a certain number, that number of black inked circles 6 or the round opaque stickers on the paper 5 should be transposed on the lower sheet 2, and FIG. 3 shows the lower sheet 2 transposed on with a coded number.

Figure 4:
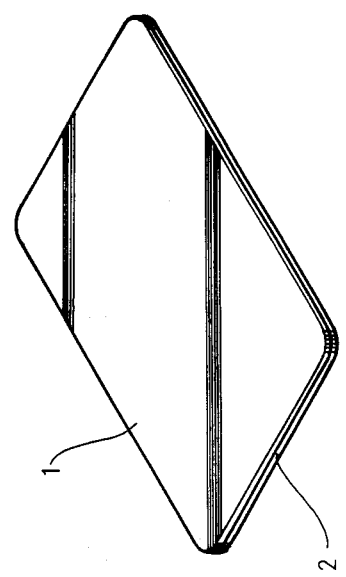
FIG. 4 is view of this card already finished in this invention.

Lastly, FIG. 4 shows that the upper sheet 1 and the lower sheet 2 have been stuck together correctly to become a finished card, with the peeling-off oiled sheet 3 removed from the upper sheet 1 and the glue side of the upper sheet 1 facing the printed side of the lower sheet 1. Then this card has been finished manually coded.

What is claimed is:

1. An assembly for manually coding cards for card readers, said assembly comprising first and second sheets of transparent plastic, metal or paper; said first sheet having one side thereof coated with glue and being originally protected with an oiled paper adapted to be peeled off therefrom; said second sheet having one side thereof printed all over with a opaque ink except for a plurality of transparent circles arranged in a regular pattern, and a paper containing a plurality of opaque elements adapted to be transposed onto selected ones of the transparent circles on the second sheet such that the transparent circles which remain after the opaque elements have been disposed over the selected transparent circles form a predetermined code; said first sheet with the oiled paper removed therefrom being adapted to be stuck together with the lower sheet with the opaque elements transposed thereon to form a finished card for card readers.

2. An assembly as claimed in claim 1 wherein said opaque elements comprise black circles printed on said paper and adapted to be transposed to the second sheet.

3. An assembly as claimed in claim 1 wherein said opaque elements comprise opaque stickers on said paper adapted to be adhesively applied over the transparent circles on the second sheet.

4. A manually codeable card for card readers, said card comprising an upper and a lower sheet of transparent plastic, metal or paper; said upper sheet having one side coated with glue and originally protected with an oiled paper adapted to be peeled off therefrom; said lower sheet having one side printed all over with opaque ink except for a plurality of transparent circles arranged in a regular pattern, a plurality of black inked circles or round opaque stickers disposed over selected ones of said transparent circles such that the transparent circles which remain after the black inked circles or round opaque stickers have been disposed over the selected transparent circles form a predetermined code; said upper sheet with the oiled paper removed therefrom being stuck together with the lower sheet to form a finished card for card readers.

* * * * *